United States Patent [19]

Kahn

[11] 4,438,850
[45] Mar. 27, 1984

[54] MEMBRANE CLOSURE STRUCTURE

[75] Inventor: Merle S. Kahn, Chesterfield County, Va.

[73] Assignee: Reynolds Metals Company, Richmond, Va.

[21] Appl. No.: 398,672

[22] Filed: Jul. 15, 1982

[51] Int. Cl.³ .................... B65D 43/02; B65D 51/20
[52] U.S. Cl. .................................. 206/634; 206/525; 220/257; 229/3.5 R; 229/43; 229/48 T
[58] Field of Search ............... 206/628, 631, 632, 633, 206/634, 525; 229/3.5, 5.5, 43, 48 SB, 48 T; 220/256, 257, 258

[56] References Cited

U.S. PATENT DOCUMENTS

| 3,054,703 | 9/1962 | Brasure | 229/3.5 R |
|---|---|---|---|
| 3,061,087 | 10/1962 | Scrivens et al. | 206/633 |
| 3,079,056 | 2/1963 | Colarusso | 229/3.5 MF |
| 3,298,593 | 1/1967 | Stephenson | 206/628 |
| 3,335,939 | 8/1967 | Robinson, Jr. | 229/43 |
| 3,552,638 | 1/1971 | Quackenbush | 206/631 |
| 3,711,011 | 1/1973 | Kugler | 206/634 |
| 3,942,676 | 3/1976 | Beckers et al. | 229/43 |
| 4,055,671 | 10/1977 | Mahaffy et al. | 229/43 |
| 4,055,672 | 10/1977 | Hirsch et al. | 229/43 |
| 4,209,126 | 6/1980 | Elias | 229/43 |

FOREIGN PATENT DOCUMENTS

| 705228 | 3/1965 | Canada | 229/3.5 MF |
|---|---|---|---|
| 2539351 | of 1977 | Fed. Rep. of Germany | 206/632 |

*Primary Examiner*—George E. Lowrance
*Assistant Examiner*—Jimmy G. Foster
*Attorney, Agent, or Firm*—Alan T. McDonald

[57] ABSTRACT

A membrane for containers is disclosed. The membrane upon being sealed to the container can withstand the rigors of retort sterilization and at the same time provide a peelable opening structure for the container with a protective cover for heating the contents of the container.

10 Claims, 5 Drawing Figures

MEMBRANE CLOSURE STRUCTURE

BACKGROUND OF THE INVENTION

Disposable retortable containers are typically formed from either metallic foils, such as aluminum foil, or plastics resins. These containers include a lip portion outwardly extending in a generally horizontal direction along the top opening thereof, providing a sealing region for a closure element.

Membrane closure elements for such retortable containers are also known. Typically, these membranes are heat and/or adhesively bonded to the lip of the container. The seal between the membrane and the container must be capable of withstanding the retort sterilization process, which process occurs in the presence of steam and/or water at temperatures of 250° F. (121° C.) and higher. In order to accomplish this, the membranes in the past have required seal strengths such that peeling of the membrane from the container by hand was impossible.

Attempts have been made to provide a peelable membrane structure. Thus, U.S. Pat. Nos. 3,946,871 and 3,946,872 describe membranes in which the seal between an aluminous metal layer and a plastics resin layer is peeled by breaking of the plastics resin layer. Although it is stated in these patents that such a membrane is retortable, it has been found that the failure rates for these containers during retorting is unacceptably high. My U.S. Application Ser. No. 279,952, filed July 1, 1981, now U.S. Pat. No. 4,381,848 solved the problem of retort failure by providing an aluminum foil layer as the peeled layer.

In each of these structures, peeling of the membrane results in an opened container, with the food or other product exposed. Recently, the increased popularity of microwave ovens and vending machine operations have produced the need for a peelable membrane for retortable containers in which the barrier layer of the membrane, which layer provides a portion of the ability to withstand retorting and which layer is typically a barrier material to microwaves, such as aluminum foil, is removed and a protective covering remains on the container after peeling, to provide protection and/or splatter resistance for the contents of the container during reheating or cooking in a microwave or other oven.

It is thus a primary object of the present invention to produce a peelable membrane structure for containers which can consistently successfully withstand the retort sterilization process and which provides a protective covering after peeling which can be opened after reheating or cooking in a microwave or other oven.

THE PRESENT INVENTION

By means of the present invention, these objectives are obtained.

The membrane structure of the present invention comprises a plastics resin film layer which is heat and/or adhesively sealed to produce a fusion bond to the flange or lip of the container, an intermediate adhesive layer and an outer barrier layer. The bond strength of the seal between the film layer and the container flange is greater than the adhesive bond strength of the adhesive to the film, which in turn is greater than the tear strength of the film. Thus, upon peeling of the membrane from the container, the film layer fails at the outer edge of the container-film seal, with the film within the seal remaining, to provide the protective cover for cooking or reheating. This cover is manually removed, such as by slitting and peeling, after cooking or reheating has been accomplished.

Optionally, additional layers, such as an additional adhesive layer and a reverse-printed film layer, may be provided over the outer barrier layer, to produce desired protective and/or decorative effects to the structure.

BRIEF DESCRIPTION OF THE DRAWINGS

The membrane structure of the present invention will be more fully described with reference to the drawings in which.

DETAILED DESCRIPTION OF THE PREFERRED EMBODIMENTS

Figure 1:
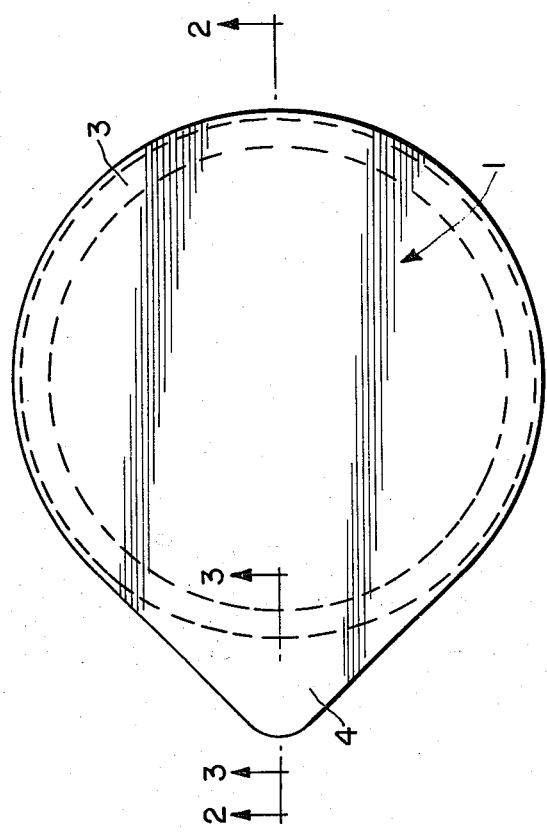
FIG. 1 is a top elevational view of a container having the membrane structure of the present invention sealed thereof.
Figure 2:
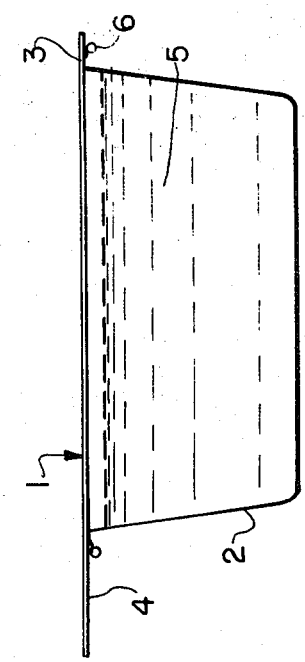
FIG. 2 is a cross-sectional view of the membrane and container taken along line 2—2 of FIG. 1.
Figure 4:
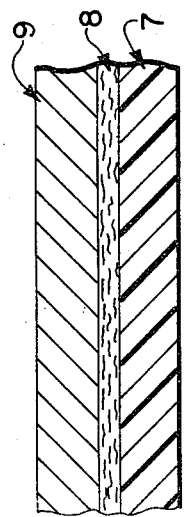
FIG. 4 is a partial cross-sectional view of the membrane structure.
Figure 3:
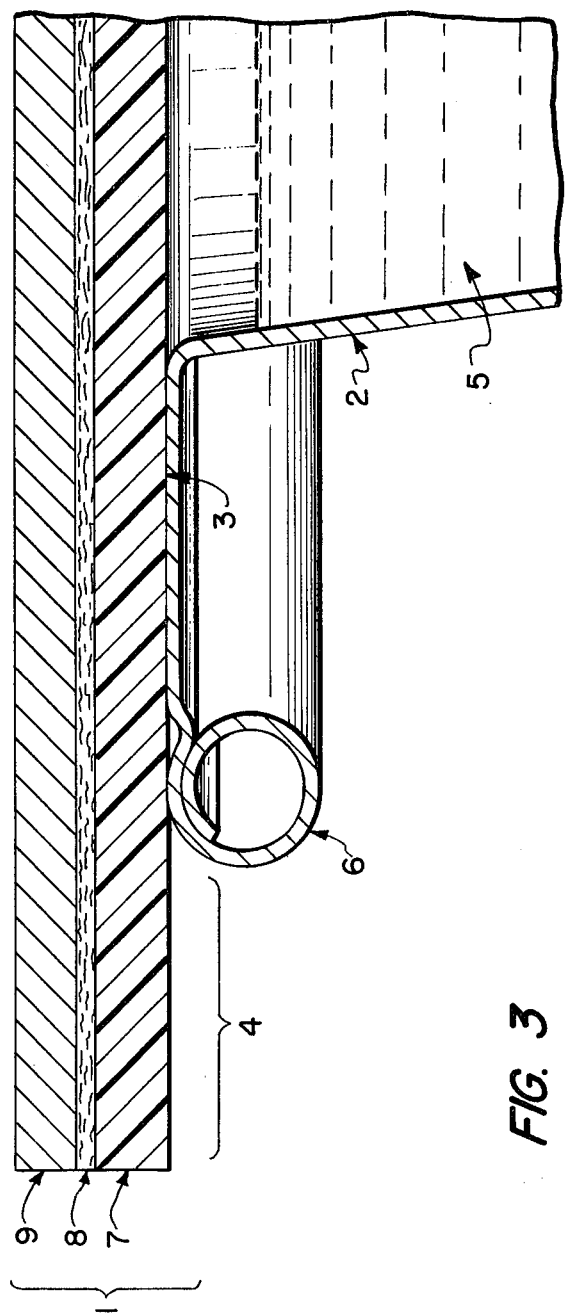
FIG. 3 is an exploded cross-sectional view of a portion of the container and membrane, taken along line 3—3 of FIG. 1.

Turning to the FIGURES, FIGS. 1 and 2 illustrate a membrane 1 which has been heat sealed to the lip or rim portion 3 of a container 2. Of course, adhesive bonding could be employed as a substitute for heat sealing. The rim portion 3 of container 2 is generally flat and includes a sufficient width thereto to provide a satisfactory heat seal of the membrane 1 to the container 2.

The container 2 may be formed of a plastics resin material or a metallic foil, such as aluminous metal foil, and, if formed of a metallic foil or a nonheat-sealable plastics resin, includes, at least on the rim portion 3 thereof, a coating or layer of a heat-sealable plastics resin material, such as polypropylenes, polyvinyl chlorides, polyethylenes, polyesters or nylons, and coextrusions, such as an ethylene acrylic acid-linear low density polyethylene coextrusion, if heat sealing is to be employed. If formed from a metallic foil, the container 2 typically includes a lip portion 6 rolled at the outer edge of rim portion 3, to prevent exposure of sharp metallic edges to the consumer.

The membrane 1 includes a first plastics resin film layer 7, which layer 7 may be formed of any of the same materials used to form the rim 3, if heat sealing is to be employed, in the case of a heat sealable plastics resin container 2, or the coating or laminate upon rim 3 in the case of a metallic or nonheat sealable plastics resin container 2. Thus, a fusion heat and/or adhesive seal can be formed between rim 3 and film layer 7, due, in the case of heat sealing, to the compatability and heat sealable nature of the materials covering rim 3 and comprising film layer 7. If employed, the coating or laminate on the flange 3 may have a thickness of between about 0.001 and 0.004 inch (0.00254 to 0.0106 cm) and the film layer 7 may have a thickness of at least about 0.001 inch (0.00254 cm).

The intermediate adhesive layer 8 is selected such that the fusion seal strength between the film layer 7 and the container rim 3 exceeds the bond strength of the adhesive layer 8 to the film layer 7 and such that the bond strength of the adhesive layer 8 to the film layer 7 exceeds the tear strength of the film layer 7.

Depending upon the material chosen for film layer 7, typical materials which may be employed to form this adhesive layer 8 include vinyls, polyesters, epoxies, ethylene vinyl acetates and polypropylene dispersions. One especially useful adhesive for use as adhesive layer 8 is an epoxy-modified polypropylene dispersion, sold under the trademark Morprime ® by Morton Chemical Company.

The adhesive layer 8 may be provided in an amount from about 0.75 to 2.0 pounds per ream (0.0012 to 0.0032 kilograms per square meter).

To enable the composite container to withstand retorting, the outer barrier layer 9 may be formed from paper or aluminum foil, with aluminum foil being the preferred material. This layer 9 must also have a tear strength in excess of that of film layer 7. When aluminum foil is employed as the barrier layer 9, the foil may have a thickness ranging between about 0.0005 and 0.0015 inch (0.00127 and 0.00381 cm).

Optional additional layers, such as a plastics resin film, which may be a reverse-printed film, such as a polyester or nylon film, may be adhesively bonded to the exposed surface of layer 9, for protective or decorative effects. However, such additional layers play no part in the function of the membrane, as far as the ability of the membrane to withstand retorting and provide a peelable seal are concerned.

Figure 5:
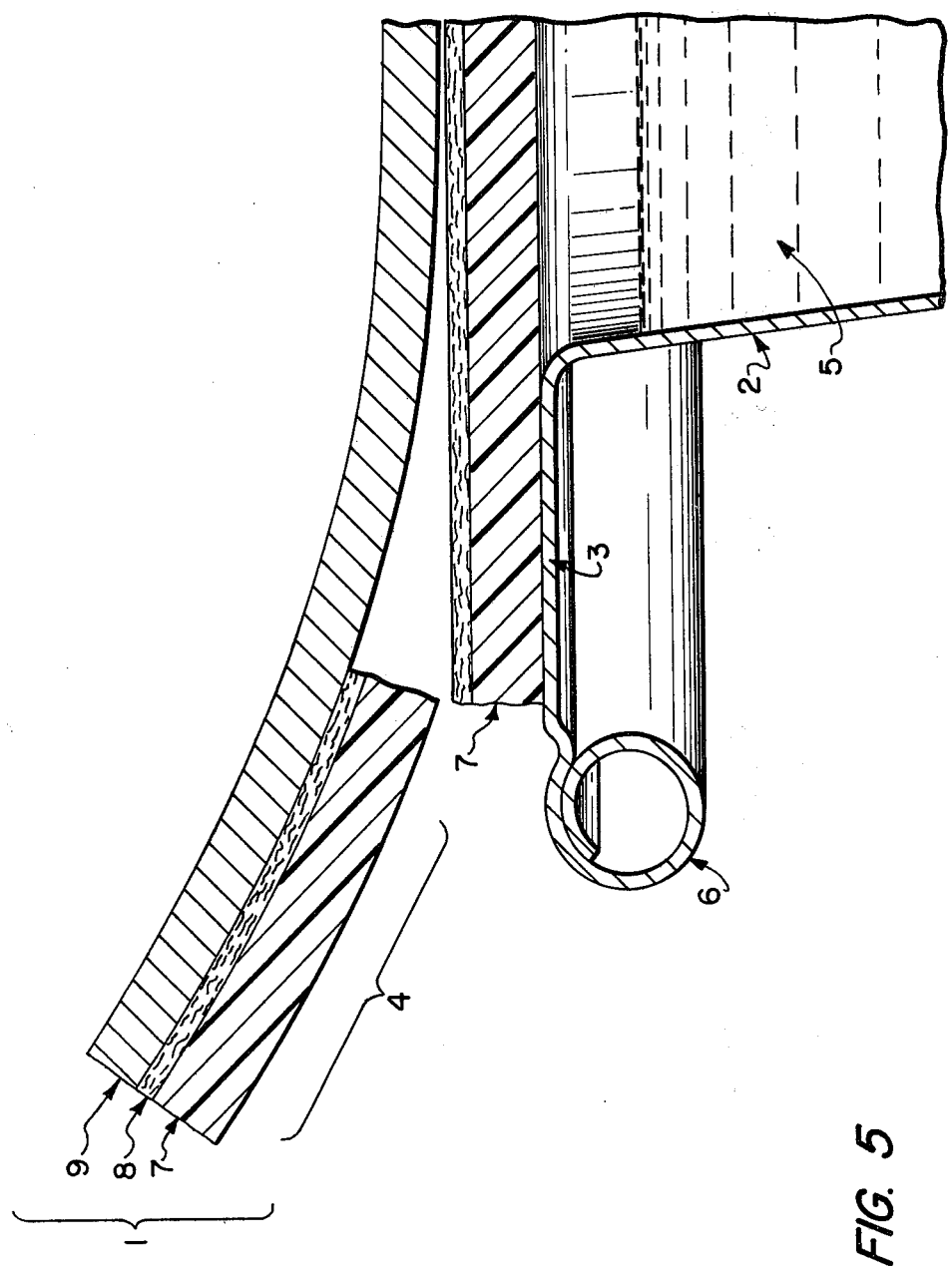
FIG. 5 is an exploded cross-sectional view of the portion of the membrane and container shown in FIG. 3 after fracture of the film layer.

The operation of the membrane structure is best shown in FIG. 5. As extended tab 4 of membrane 1 is raised, shearing forces are placed upon the layers 7, 8 and 9. As previously mentioned, the tear strength of film layer 7 is less than the adhesive bond strength between layers 7 and 8, thus, initial failure occurs within film layer 7, rather than at an adhesive bond. This failure progresses around the outer edge of the seal between film layer 7 and rim 3. The portion of film layer 7 within rim 3 will remain in place, providing the required covering. As illustrated, the remaining portion of film layer 7 remains attached to adhesive layer 8, since, as illustrated, the adhesive bond strength of film layer 7 to adhesive layer 8 is in excess of the adhesive bond strength of adhesive layer 8 to barrier layer 9. However, it is also possible to have adhesive layer 8 peel off with barrier layer 9, if the adhesive bond strength between adhesive layer 8 and barrier layer 9 exceeds the bond strength between adhesive layer 8 and film layer 7. This provides a protective cover for the contents of container 2, to enable reheating or cooking thereof in a microwave or other oven without splattering.

After heating, the remaining film 7 is removed manually, by slitting and pulling, for example, to expose the contents of container 2.

EXAMPLE

An aluminum container having the general configuration as shown in FIG. 2 and having a thickness of 0.005 inch (0.00127 cm) was formed with a 0.0015 inch (0.00381 cm) cast polypropylene layer on the surface of rim 3, as well as coating the entire interior of the container 2. A membrane 1, having the general configuration as shown in FIG. 1 was formed having a first film layer 7 formed of a 0.001 inch (0.00254 cm) polypropylene film, an adhesive layer 8 of 1.0 pound per ream (0.0016 kilogram per square meter) epoxymodified polypropylene and a barrier layer 9 of 0.0015 inch (0.00381 cm) aluminum foil. The membrane also included a 2.0 pound per ream (0.0032 kilogram per square memter) polyester advesive layer and a 0.00096 inch (0.00244 cm) reverse-printed polyester film covering barrier layer 9.

The container was heat sealed under 1268 pounds (575.16 kilograms) of pressure and at a temperature of 500° F. (260° C.) and retorted at a temperature of 250° F. (120° C.).

Upon raising tab 4 and peeling membrane 1 under hand pressure, clean tear of film layer 7 along the outer edge of the heat seal of the membrane 1 with rim 3 occurred, with the heat sealed portion of film layer 7 and the portion of film layer 7 inside the heat seal remaining on the container 2, along with the corresponding portion of adhesive layer 8, providing a protective cover for the container 2.

From the foregoing, it is clear that the present invention provides a membrane which is peelable, retortable, and which provides a protective cover for microwave or other cooking or reheating.

While the present invention has been illustrated with respect to certain specific embodiments thereof, it is not intended to be so limited thereby, except as set forth in the following claims.

I claim:

1. A membrane closure for a container, said membrane closure being heat sealable to said container and said membrane closure being capable of withstanding retort sterilization, said membrane closure comprising a plastics resin film layer, said plastics resin film layer providing protection and splatter resistance for contents of said container after removal of a barrier layer therefrom, an intermediate adhesive layer bonded on one side thereof to said plastics resin film layer and a barrier layer bonded on one side thereof to the other side of said adhesive layer, said plastics resin film layer having a heat seal strength to said container greater than the adhesive strength of said adhesive layer to said plastics resin film layer and said plastics resin film layer having a tear strength less than the adhesive strength of said adhesive layer to said plastics resin film layer, whereby upon peeling of said membrane closure from said container under hand pressure, failure occurs within said plastics resin film layer at an outer edge of a heat seal between said membrane closure and said container, thereby removing said barrier layer and providing a protective covering for the contents of said container.

2. The membrane closure of claim 1 wherein said plastics resin film layer is selected from the group consisting of polypropylenes, polyvinyl chlorides, polyethylenes, polyesters and nylons.

3. The membrane closure of claim 1 wherein said adhesive layer is selected from the group consisting of polypropylenes, epoxy or modified polypropylenes, polyvinyl chlorides, polyethylenes, polyesters and nylons.

4. The membrane closure of claim 1 wherein said barrier layer is selected from the group consisting of aluminum foil and paper.

5. The membrane closure of claim 1 further comprising a second adhesive layer having one side thereof bonded to the other said of said barrier layer and an outer layer having one side thereof bonded to the other side of said second adhesive layer.

6. The membrane closure of claim 5 wherein said second adhesive layer is a polyester adhesive.

7. The membrane closure of claim 5 wherein said outer layer is a plastics resin film.

8. The membrane closure of claim 5 wherein said outer layer is a reverse-printed plastics resin film.

9. The membrane closure of claim 5 wherein said outer layer is a polyester or nylon film.

10. The membrane closure of claim 5 wherein said outer layer is a reverse-printed polyester or nylon film.

* * * * *